United States Patent [19]

Ward et al.

[11] Patent Number: 4,878,085
[45] Date of Patent: Oct. 31, 1989

[54] CYLINDER AND HUB LOCKING METHOD AND APPARATUS

[75] Inventors: Leonard Ward, Melbourne; George Darnofall, West Melbourne, both of Fla.

[73] Assignee: Storage Technology Corporation, Louisville, Colo.

[21] Appl. No.: 43,486

[22] Filed: Apr. 28, 1987

[51] Int. Cl.⁴ .................... G03B 27/22; G03B 27/58
[52] U.S. Cl. ........................................ 355/47; 29/123; 355/117; 411/907; 411/915
[58] Field of Search ............. 355/3 DR, 47, 104, 113, 355/117; 29/123, 132; 40/10 D, 341, 346, 348; 285/404; 411/34, 542, 544, 907, 915

[56] References Cited

U.S. PATENT DOCUMENTS

| | | | |
|---|---|---|---|
| 2,257,538 | 9/1941 | Schlueter | 411/34 |
| 2,512,487 | 6/1950 | De Lacy | 355/117 |
| 2,678,585 | 5/1954 | Ellis | 411/544 X |
| 3,566,497 | 3/1971 | Hamlen | 29/132 X |
| 3,858,287 | 1/1975 | Christoffersen | 29/132 |
| 4,030,826 | 6/1977 | Sangster | 355/104 |
| 4,289,060 | 9/1981 | Emmett | 411/34 |

OTHER PUBLICATIONS

Timoshenko, S. and Young, D. H., *Elements of Strength of Materials*, N.Y., D. Van Nostrand Company, 1968, pp. 86–91.

Hopkins, R. Bruce, "Seals", in: Shigley, J. E. and Mischke, C. R., *Standard Handbook of Machine Design*, N.Y., McGraw-Hill Book Company, 1986, pp. 26.24–26.39, TJ230.S8235.

*Primary Examiner*—Fred L. Braun
*Attorney, Agent, or Firm*—Dorr, Carson, Sloan & Peterson

[57] ABSTRACT

A method and apparatus for locking the drive hubs of a forms overlay station in a laser electrographic printer to its transparent forms overlay drum includes counterboring a plurality of holes through the drum into the hubs, inserting a resilient member such as an O-ring into each counterbored hole, and compressing the resilient member to form an interference fit among the compressed resilient member and an interface formed within the counterbored hole by the drum and hubs.

8 Claims, 2 Drawing Sheets

CYLINDER AND HUB LOCKING METHOD AND APPARATUS

BACKGROUND OF THE INVENTION

This invention relates generally to high-speed laser electrographic printers, and more particularly to a method and apparatus for locking the transparent cylinder used as a forms overlay drum in such printers to the drive hubs upon which it is mounted.

Forms overlays are particularly suited for printing tasks where variable data or images are to be added to fixed data or images. For example, the thousands of bank statements provided to depositors are fixed images to which the variable debit and credit data of the many individual depositors is added or integrated. However, this bank statement printing chore is comparatively straight forward because the forms contains blank or white spacers for receiving the variable debit and credit data. That is, the variable data doesn't overlie the fixed data. A more complex task is overprinting a traveler's route onto a complex map where two images or sets of data are printed in the same area on the paper or other support member.

The forms overlay technique is advantageous to electronic printing and computer printing in particular because its use saves the electronic memory storage space required to electronically print the form for other electronic control functions. Often this saving in memory space yields a meaningful cost improvement to the entire printing system.

Conventional laser electrographic printers utilize a negative-on-negative approach for forms overlay. The Xerox Corporation Xerox 1200 computer printer, the Siemens Corporation Siemens 3352 laser printer, and the International Business Machines Corporation IBM 3800 printing subsystem are examples of negative-on-negative or negative overlay electrographic printers. Briefly, in each, a latent electrostatic image is generated in response to electronic signals on a charged photoconductive surface by exposing the charged surface to electromagnetic radiation, such as light from a laser, thereby discharging the surface in areas struck by the light. The discharged areas against the undischarged background define the negative latent electrostatic image, while the inverse defines a positive latent electrostatic image. The discharged areas are analogous to white markings on a black background for a reflection image or transparent markings on an opaque background for a transparency image. The negative latent image is made visible or developed by depositing black toner onto the discharged areas and transferring the black toner to white paper. The development and transfer steps convert the negative latent electrostatic image to a positive reflection image. The toner image printed from the electronic signals is hereinafter referred to as an electronic image or print. Further information pertaining to the IBM 3800 printing subsystems and related support systems is available in the IBM publications GA32-0049-0, "Introducing the IBM 3800 Printing Subsystem Model 3," GA32-0050-1, "Reference Manual for the IBM 3800 Printing Model 3," and GH20-9158-4, "Document Composition General Information," which are incorporated herein by reverence.

The "forms overlay" printer or image is created by the above commercial computer printers by exposing the charged photoconductive surface to a light image of a negative reflection print or negative transparency print or overlay. When the negative overlay is flooded with light and the reflected or transmitted light strikes the photoconductor, a negative latent electrostatic image is created. The overlay latent image is composed of discharged areas representing markings on a charged background. The development and transfer of the overlay latent image inverts or converts the negative sense of the image to the positive sense as in the case of the above described electronic image.

The overlay and electronic images are generated during a single cycle of the electrographic computer printers. Each of these printers employ a rotating photoconductive drum and electronic overlay images are generated during a single cycle or rotation of the drum prior to the development step. This means that the image is superimposed over the other on the same area of the photoconductive drum. This superimposition is possible because of the negative mode of operation. The first image (e.g., the electronic image) discharges the drum only in information areas and not background areas. Statistically, the information areas occupy significantly less space than the background areas. Consequently, the second image in this example the overlay image, is recorded in the charged background regions of the electronic image. In other words, the second image can be produced only if the first left significant areas of charge on the drum surface on which the second image can be recorded.

In other laser electrographic printers, such as the 6100 Printing Subsystem of Storage Technology Corporation, the negative-on-negative approach to forms overlay is accomplished in a somewhat different manner. A film negative of the form to be printed is mounted on a transparent cylinder, known as the forms overlay drum, which is rotated synchronously with the photoconductive drum at the same circumferential speed. The image of the form negative is projected onto the photoconductive drum by means of a fluorescent lamp inside the forms overlay drum and a fixed optical system. In this way, a copy of the image on the negative is printed or superimposed on the data printed by the laser printing system. Further information pertaining to the 6100 Printing Subsystem and related support systems is available in the Storage Technology Corporation publications P/N 3825131501, "6100 Printing Subsystem Paper Specification", P/N 3825131601, "6100 Printing Subsystem Forms Design Guide", P/N 3825118701, "6100 Printing Subsystem Operators Manual and Product Description Manual", and EP-064-0, "6100 Printing Subsystem Consumables and Accessories Catalog", which are incorporated herein by reference.

One particular problem encountered with printers of the type utilizing form overlay drums, such as the 6100 Printing Subsystem of Storage Technology Corporation, is that the transparent cylinder of such drums often fail due to stress cracking at the screw mounting holes on the drive hubs. Initially, the transparent cylinder was attached to the drive hubs through a pinned arrangement. Such an arrangement, however, did not sufficiently lock the transparent cylinder to the drive hubs which resulted in cylinder slippage causing misregistration of the image from the film negative with respect to the electronic image superimposed thereon. As is readily apparent to one of ordinary skill in the art, such slippage would lead to a torque loading between the cylinder and hubs due to the torsion which would be experienced by the slipping, thin-walled cylinder. It was, therefore, desirable to provide an improved method and apparatus for locking the transparent cylinder to its respective drive hubs.

Subsequent efforts to provide an improved forms overlay drum resulted in cementing of the transparent cylinder to its drive hubs. After the cement had dried, the transparent cylinder, typically comprised of Plexiglas ® (a registered trademark of the Rohm and Haas Company), was mechanically locked to the drive hubs with a pair of flat head screws countersunk in the drum. Such an arrangement, however, in operation proved to be deficient in spite of its improved locking nature. Due to the extreme thermal changes brought on by the fluorescent lamp inside the forms overlay drum, the cement used to bind the transparent cylinder to its respective drive hubs quickly becomes brittle and breaks loose, thereby putting more stress on the flat head screws used to mechanically lock the cylinder to the hubs. Thereafter, shock loading and vibration experienced during operation of the printer causes undue stress on the joints which lock the two parts together, often resulting in stress cracks in the transparent cylinder at the countersunk holes. It would, therefore, be desirable to provide an improved method and apparatus for locking the transparent cylinder to its respective drive hubs which is capable of withstanding thermal changes and shock loading without putting undue stresses on the joint.

SUMMARY OF THE INVENTION

Accordingly, it is a general object of the present invention to provide a method and apparatus for joining the transparent cylinder of a forms overlay drum in a laser electrographic printer to its drive hubs. More specifically, it is an object of this invention to provide a forms overlay drum which eliminates the possibility of misregistration between the image from the film negative mounted upon the forms overlay drum and the electronic image superimposed therewith.

Another object of the present invention is to provide a method and apparatus for locking the transparent cylinder of a forms overlay drum to its drive hubs which is capable of withstanding thermal changes and shock loading experienced during operation of the printer without putting undue stresses on the joint.

Still another object of the present invention is to provide a forms overlay drum which is easy to install.

Briefly, these and other objects of the present invention are provided by a forms overlay drum comprised generally of a transparent cylinder, typically formed of a plastic such as Plexiglas ® joined together with its respective drive hubs, which may be comprised of aluminum or molybdenum-coated stainless steel. The cylinder is first slip fit onto the hubs, with at least three counterbored holes drilled therethrough equally spaced radially about the hubs, each of the counterbored holes partially extending into the hub. A smaller threaded hole is tapped coaxially with each of the counterbored holes in order to provide for the threaded coupling of mounting means such as a pan head screw. Thereafter, a resilient "O" ring having the same outside diameter as the diameter of the counterbored holes is inserted within each of the counterbored holes, the screw being threaded through the "O" ring into the tapped hole partially compressing the "O" ring with the head of the screw and creating an interference fit between the "O" ring and the side walls of the counterbored hole. As a result, the three equally spaced "O" rings, when compressed, will provide a locked joint without any radial or axial movement, and without the use of adhesives such as cement.

The foregoing and other objects, features and advantages of the present invention will be better understood from the following more detailed description, when considered in conjunction with the accompanying drawings wherein:

DESCRIPTION OF THE PREFERRED EMBODIMENT

Figure 1:
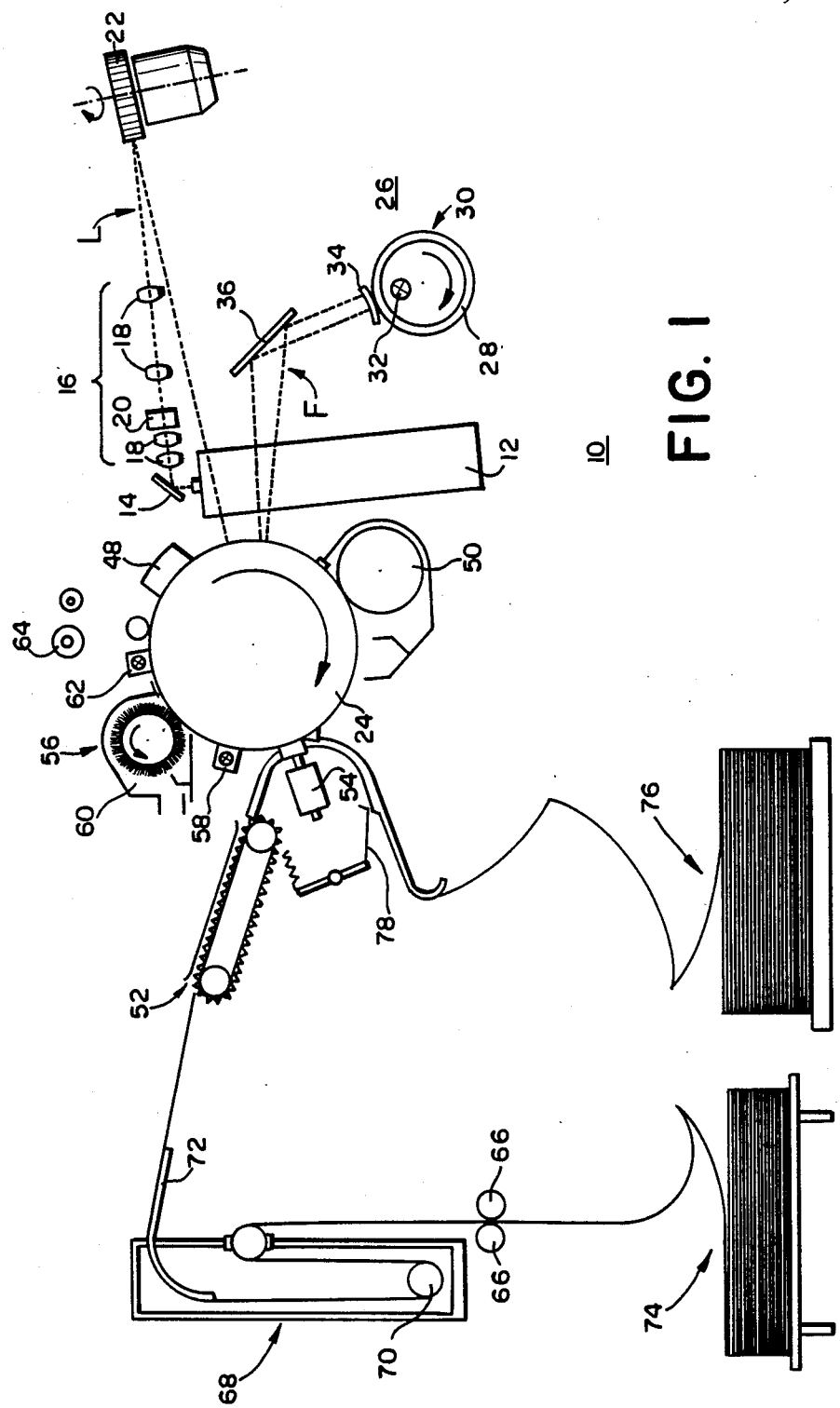
FIG. 1 is a schematic diagram of a high-speed laser electrographic printer utilizing the forms overlay drum in accordance with the present invention.

Referring now to the drawings, wherein like characters designate like or corresponding parts throughout the several views, there is shown in FIG. 1 a schematic diagram of a laser electrographic printer such as the 6100 Printing Subsystem 10 marketed by the assignee of the present invention. A sharply directedly laser beam (indicated by the dotted line L) is generated by a helium-neon laser 12, deflected by a laser deflection mirror 14, and directed through a laser optical system 16 comprised generally of a plurality of lenses 18 and an acousto-optical deflector 20. The laser beam L is thereafter reflected horizontally by a rotating 14-face polygon mirror 22 onto the photoconductor drum 24 of the printing subsystem 10. The beam L scans from left to right in accordance with data stored in an electronics unit (not shown) which contains a 255-character matrix memory. Every character is conventionally formed by a number of dots and is stored as a dot matrix in the matrix memory, such that the character is read out of memory dot by dot and converted into frequency signals.

The acousto-optical deflector 20 intercepts the laser beam L and, in response to the high frequency signals generated from the character matrix memory, separates the laser beam L vertically into a maximum of five beams and turns these on and off. The individual light dots produced in this manner, with a diameter of approximately 0.006 inches (0.15 millimeters), are so densely arrayed that solid lines of lettering are produced.

As is conventional, a forms overlay station 26 can eliminate the need for preprinted forms. With this feature, continuous blank paper may be used. A film negative (not shown) of the form to be printed is mounted on a transparent cylinder 28 of a forms overlay drum 30 which is rotated synchronously with the photoconductive drum 24 at the same circumferential speed. The image of the form negative is projected onto the photoconductive drum 24 by means of a fluorescent lamp 32 inside the forms overlay drum 30, a fixed optical system 34, and forms overlay deflector mirror 36. As in the case of the laser beam L, the light path for the image from the forms overlay drum 30 is indicated by dotted lines F. Further details relating to the operation of the printing subsystem 10 may be found in the Storage Technology Corporation publication P/N 3825118701, "6100 Printing Subsystem Operators Manual and Product Description Manual".

Figure 2:
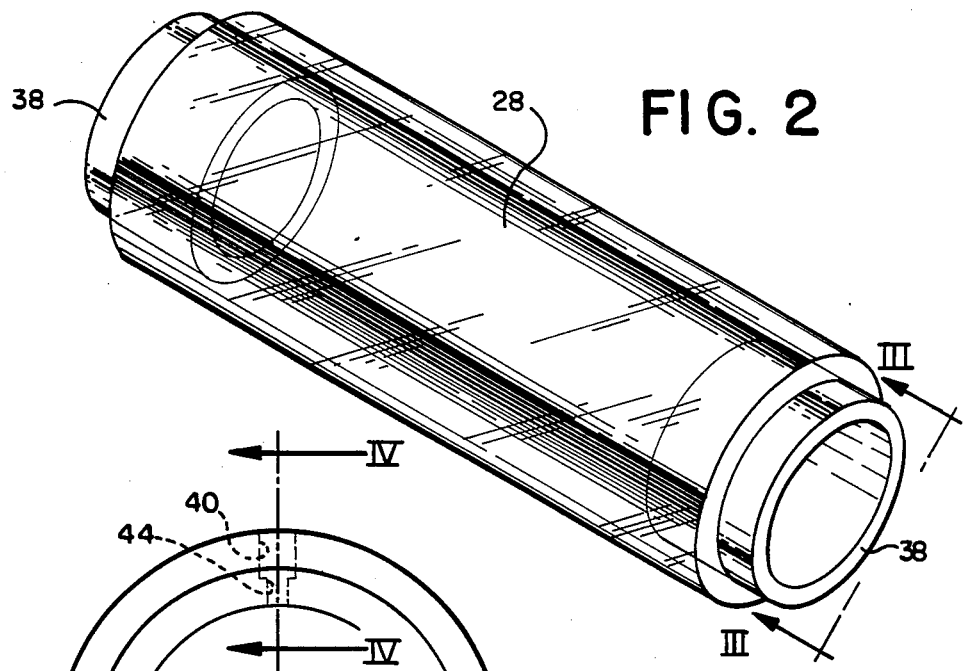
FIG. 2 illustrates the forms overlay drum schematically shown in FIG. 1.
Figure 3:
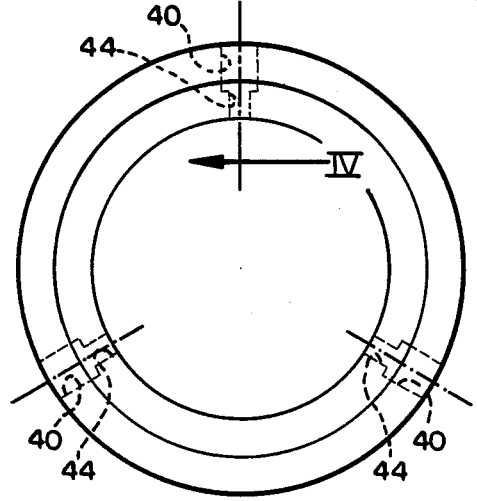
FIG. 3 is an end view of the forms overlay drum shown in FIG. 2 taken along the lines III—III.
Figure 4:
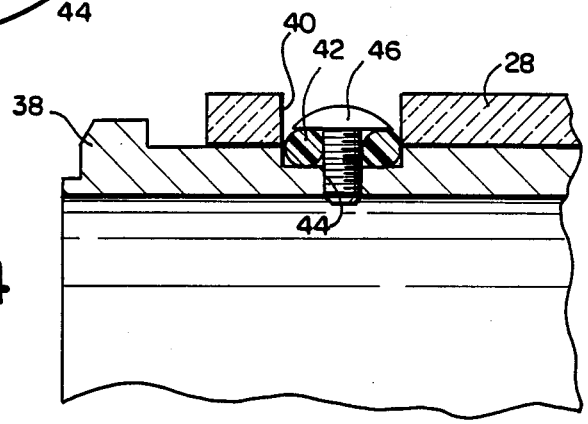
FIG. 4 is a detailed sectional view of the locking method and apparatus for the forms overlay drum shown in FIG. 3 taken along the lines IV—IV.

Referring now to FIGS. 2–4, the improved forms overlay drum 30 according to the present invention may now be described. The transparent cylinder 28 is mounted to a pair of drive hubs 38 which are slip fitted therein. At least three holes 40 are counterbored through the transparent cylinder 28 partially into each drive hub 38 in order that a resilient member such as an "O" ring 42 may be inserted therein. A threaded hole 44 is tapped coaxially with each hole 40 so that mounting means such as a pan head screw 46 may be threadedly coupled to the tapped hole 44, thereby compressing the "O" ring 42 to provide an interference fit between the "O" ring 42 and the walls of the counterbored hole 40.

In a preferred embodiment of the present invention, the transparent cylinder 28 is comprised of a Plexiglas ® cylinder having a wall thickness of 0.090 inches, while the drive hubs 38 are comprised of aluminum or molybdenum-coated stainless steel. Each drive hub 38 is, as described herein above, slip fit within the cylinder 28. Thereafter, three counterbored holes 40 are drilled through the Plexiglas ® cylinder 28 and into the drive hubs 38 to a depth of 0.030 inches each hole 40 being typically 0.250 inches in diameter. A #4–40 hole 44 is thereafter tapped coaxially with each hole 40 into the drive hubs 38. The "O" rings 42, comprised of a resilient material such as rubber and having an outside diameter substantially equal to the diameter of the counterbored hole 40, are inserted into the counterbored holes 40. One suitable such "O" ring 42 has an outside diameter of 0.250 inches and a wall thickness of 0.060 inches. A 0.25 inch long, #4–40 pan head screw 46 is thereafter inserted through the "O" ring 42 into the tapped hole 44, and snugged down to expand the "O" ring 42 against the walls of the counterbored holes 40, thereby creating an interference fit between the "O" ring 42 and the side walls of the counterbored hole 40. It is known, for example, from Hopkins in the *Standard Handbook of Machine Design* that friction factors of compressed "O" rings can be varied in proportion to the degree of their compression. As a result, and because of the known friction forces which are created by compressing the "O" rings 42, the three equally spaced "O" rings (FIG. 3), when compressed, will provide a locked joint without any radial or axial movement. Moreover, adhesives such as the cement utilized in prior art approaches are not required, thereby facilitating the installation of forms overlay drum 30 in accordance with the present invention.

Although particular embodiments of the invention have been shown and described and various modifications suggested, it will be appreciated that other embodiments and modifications which fall within the true spirit and scope of the invention as set forth in the appended claims will occur to those of ordinary skill in the art.

What is claimed is:

1. In a laser electrographic printer having a photoconductor drum rotatable at a constant speed and a forms overlay station adapted to project an image of a film negative mounted on a transparent drum, wherein the transparent drum is driven to rotate synchronously with the photoconductor drum by a pair of hubs connected thereto, a method of joining the hubs to the transparent drum comprising the steps of:

providing the pair of hubs, each hub having a predetermined outside diameter;

providing the transparent drum with a cylinder having an inside diameter substantially equal to said outside diameter and a predetermined wall thickness;

slip fitting the pair of hubs provided within said cylinder at respective ends thereof;

providing a plurality of holes through said cylinder into the hubs, said holes being spaced equidistantly radially about said cylinder and having a predetermined diameter;

inserting a resilient member into each said hole at an interface formed by said cylinder and the hubs, each said resilient member having an outside diameter substantially equal to said predetermined diameter; and compressing said resilient members, thereby creating an interference fit between each said resilient member and its respective interface;

whereby said compressed resilient members, in shear, absorb torque loading between said cylinder and the hubs.

2. The method according to claim 1, wherein said hole providing step comprises:

counterboring, at each end of said cylinder, at least three holes radially through said cylinder into the hubs to a preselected depth, said counterbored holes having a predetermined diameter;

boring a through hole coaxially with each said counterbored holes; and tapping said through holes.

3. The method according to claim 2, wherein said insertion step comprises:

providing a plurality of O-rings, each said O-ring having an outside diameter substantially equal to the diameter of said counterbored holes; and slip fitting each said O-ring within a respective one of said counterbored holes.

4. The method according to claim 3, wherein said compression step comprises threading a screw within each said tapped through hole, through the O-ring slip fit within said counterbored hole, thereby forcing said O-ring against the walls of said counterbored hole.

5. The method according to claim 2, wherein said preselected depth corresponds to said predetermined wall thickness by a ratio of at least 1:3.

6. A forms overlay station for projecting an image of a film negative to a photoconductor drum of a laser electrophotographic printer, wherein the photoconductor drum is rotatable at a constant speed, comprising:

a transparent drum for mounting the film negative, said transparent drum having a predetermined inside diameter and a predetermined wall thickness, and also having formed therein at each end thereof a plurality of holes spaced equidistantly radially thereabout, said plurality of holes having an equal diameter;

light means, mounted within said transparent drum, for projecting the image therefrom;

drive means for rotating said transparent drum synchronously with the photoconductor drum, said drive means including a pair of drive hubs, each of which has an outside diameter that is slip fit within said predetermined inside diameter of said transparent drum at respective ends thereof, and each of which includes a plurality of holes that are counterbored to a preselected depth and are of the same diameter as said holes in said transparent drum, each said counterbored hole juxtaposed to a respective one of said holes in said transparent drum; a motor coupled to rotate said drive hubs; and
a plurality of O-rings and screw means for coupling said transparent drum to said drive hubs through said juxtaposed holes, wherein each said O-ring has an outside diameter substantially equal to the diameter of said juxtaposed holes and a thickness of about twice said preselected depth, said screw means compressing said O-rings in said juxtaposed holes whereby said compressed O-rings in shear, absorb torque loading between said drive hubs and said transparent drum.

7. The forms overlay station according to claim 6, wherein said transparent drum comprises a plastic.

8. The forms overlay station according to claim 7, wherein said plastic comprises Plexiglas ®.